United States Patent
Ballantyne

(10) Patent No.: US 8,880,010 B2
(45) Date of Patent: Nov. 4, 2014

(54) DUAL-LOOP TRANSMIT NOISE CANCELLATION

(75) Inventor: Gary J. Ballantyne, Christchurch (NZ)

(73) Assignee: QUALCOMM Incorporated, San Diego, CA (US)

( * ) Notice: Subject to any disclaimer, the term of this patent is extended or adjusted under 35 U.S.C. 154(b) by 1245 days.

(21) Appl. No.: 12/649,754

(22) Filed: Dec. 30, 2009

(65) Prior Publication Data

US 2011/0158346 A1     Jun. 30, 2011

(51) Int. Cl.
    H04B 1/00     (2006.01)
    H04B 1/52     (2006.01)
    H04B 1/04     (2006.01)

(52) U.S. Cl.
CPC .............. *H04B 1/525* (2013.01); *H04B 1/0475* (2013.01)
USPC ....... 455/114.2; 455/91; 455/114.3; 455/115; 455/126

(58) Field of Classification Search
CPC ............... H04B 1/00; H04B 1/02; H04B 1/04
USPC .............. 455/73, 91, 114.2, 115.1, 501, 63.1, 455/114.3, 126; 375/295, 346
See application file for complete search history.

(56) References Cited

U.S. PATENT DOCUMENTS

| | | |
|---|---|---|
| 4,006,351 A | 2/1977 | Constant |
| 4,532,639 A | 7/1985 | Price et al. |
| 4,742,532 A | 5/1988 | Walker |
| 5,710,521 A | 1/1998 | Butler |
| 5,841,388 A | 11/1998 | Yasuda et al. |
| 5,898,665 A | 4/1999 | Sawahashi et al. |
| 5,959,499 A | 9/1999 | Khan et al. |
| 5,995,567 A | 11/1999 | Cioffi et al. |
| 6,400,233 B1 | 6/2002 | Thomas |
| 6,625,436 B1 | 9/2003 | Tolson et al. |

(Continued)

FOREIGN PATENT DOCUMENTS

| | | |
|---|---|---|
| CN | 1211944 C | 7/2005 |
| CN | 1663131 A | 8/2005 |

(Continued)

OTHER PUBLICATIONS

Razavi, "Architectures and circuits for RF CMOS receivers," IEEE 1998 Custom Integrated Circuits Conference, May 1998, pp. 393-400.

(Continued)

*Primary Examiner* — Tuan Pham
(74) *Attorney, Agent, or Firm* — Anthony R. Morris

(57) ABSTRACT

A transmitter circuit is described. The transmitter circuit includes a first local oscillator that generates a first frequency equal to a duplex frequency. The transmitter circuit also includes a second local oscillator that generates a second frequency equal to a receive frequency. The transmitter circuit further includes a first mixer that combines the first frequency with a first input signal. The transmitter circuit also includes a first feedback loop. The first feedback loop includes a second mixer that combines the second frequency with a transmit signal and a first filter and a first adder that combines an output of the first mixer with an output of the first filter. The transmitter circuit also includes a third local oscillator that generates a third frequency equal to the receive frequency. The transmitter circuit further includes a third mixer that combines the third frequency with an output of the first adder.

13 Claims, 12 Drawing Sheets

(56) References Cited

U.S. PATENT DOCUMENTS

| | | |
|---|---|---|
| 6,745,003 B1 | 6/2004 | Maca et al. |
| 7,062,233 B2 | 6/2006 | Huttunen |
| 7,483,685 B2 | 1/2009 | Lewis |
| 7,711,329 B2 | 5/2010 | Aparin et al. |
| 7,761,063 B2 | 7/2010 | Tsuda et al. |
| 7,965,134 B2 | 6/2011 | Aparin et al. |
| 8,135,348 B2 | 3/2012 | Aparin |
| 2001/0038666 A1 | 11/2001 | Mesecher et al. |
| 2002/0041208 A1 | 4/2002 | Hamada et al. |
| 2002/0072344 A1 | 6/2002 | Souissi |
| 2002/0080891 A1 | 6/2002 | Ahn et al. |
| 2002/0136324 A1 | 9/2002 | Nagasaka |
| 2003/0031271 A1 | 2/2003 | Bozeki et al. |
| 2003/0125065 A1 | 7/2003 | Barak et al. |
| 2004/0109512 A1 | 6/2004 | Fonden et al. |
| 2004/0142667 A1 | 7/2004 | Lochhead et al. |
| 2004/0166813 A1 | 8/2004 | Mann et al. |
| 2004/0237007 A1 | 11/2004 | Busking |
| 2005/0047521 A1 | 3/2005 | Ishikawa et al. |
| 2005/0073361 A1 | 4/2005 | Hamada et al. |
| 2005/0124375 A1 | 6/2005 | Nowosielski |
| 2005/0180527 A1 | 8/2005 | Suzuki et al. |
| 2005/0253745 A1 | 11/2005 | Song et al. |
| 2006/0050810 A1 | 3/2006 | Haque et al. |
| 2006/0105715 A1 | 5/2006 | Kodani et al. |
| 2006/0281419 A1* | 12/2006 | Peplinski et al. ............... 455/83 |
| 2007/0069813 A1 | 3/2007 | Li et al. |
| 2007/0184782 A1 | 8/2007 | Sahota et al. |
| 2008/0171522 A1 | 7/2008 | Ben-Ayun et al. |
| 2008/0233894 A1 | 9/2008 | Aparin |
| 2009/0036082 A1 | 2/2009 | Sajid et al. |
| 2009/0042521 A1 | 2/2009 | Otaka et al. |
| 2009/0213770 A1 | 8/2009 | Mu |
| 2009/0221245 A1 | 9/2009 | Gonikberg et al. |
| 2009/0264089 A1 | 10/2009 | Suzuki et al. |
| 2010/0022206 A1 | 1/2010 | Aparin et al. |
| 2010/0048149 A1 | 2/2010 | Tang et al. |
| 2010/0109771 A1 | 5/2010 | Baik et al. |
| 2010/0167639 A1* | 7/2010 | Ranson et al. ................. 455/24 |
| 2010/0201442 A1 | 8/2010 | Akaiwa |
| 2010/0322346 A1 | 12/2010 | Aparin |
| 2010/0327932 A1 | 12/2010 | Aparin et al. |
| 2011/0143697 A1 | 6/2011 | Verma et al. |

FOREIGN PATENT DOCUMENTS

| | | |
|---|---|---|
| CN | 101267218 A | 9/2008 |
| EP | 1531553 | 5/2005 |
| EP | 1657814 A1 | 5/2006 |
| EP | 2019486 | 1/2009 |
| JP | 08088577 | 4/1996 |
| JP | 2000115009 A | 4/2000 |
| JP | 2000509577 A | 7/2000 |
| JP | 2001060903 A | 3/2001 |
| JP | 2006140785 A | 6/2006 |
| JP | 2007174252 A | 7/2007 |
| JP | 2008017218 A | 1/2008 |
| JP | 2010523058 A | 7/2010 |
| WO | 9740587 A1 | 10/1997 |
| WO | 03103166 A1 | 12/2003 |
| WO | WO2005053152 | 6/2005 |
| WO | 06068635 | 6/2006 |
| WO | 2008004916 A1 | 1/2008 |
| WO | 2008048534 A1 | 4/2008 |
| WO | WO2008094259 A1 | 8/2008 |
| WO | 2008118898 | 10/2008 |
| WO | WO2010011977 | 1/2010 |

OTHER PUBLICATIONS

Razavi, "A 900-MHz/1.8-GHz CMOS transmitter for dual-band applications," IEEE Journal of Solid-State Circuits, May 1999, vol. 34, No. 5, pp. 573-579.

Rudell, et al. "A 1.9-GHz wide-band IF double conversion CMOS receiver for cordless telephone applications," IEEE Journal of Solid-State Circuits, Dec. 1997, vol. 32, No. 12, pp. 2071-2088.

International Search Report and Written Opinion—PCT/US2010/062233—ISA/EPO—Apr. 13, 2011.

Mizusawa N et al: "Third- and fifth-order baseband component injection for linearization of the power amplifier in a cellular phone", IEEE Transactions on Microwave Theory and Techniques, IEEE Service Center, Piscataway, NJ, US, vol. 53, No. 11, Nov. 1, 2005, pp. 3327-3334, XP001512580, ISSN: 0018-9480, DOI: DOI:10.1109/TMTT.2005.855747.

Taiwan Search Report—TW099146399—TIPO—Aug. 5, 2013.

* cited by examiner

DUAL-LOOP TRANSMIT NOISE CANCELLATION

TECHNICAL FIELD

The present disclosure relates generally to communication systems. More specifically, the present disclosure relates to systems and methods for dual-loop transmit noise cancellation.

BACKGROUND

Wireless communication systems are widely deployed to provide various types of communication content such as voice, video, data, and so on. These systems may be multiple-access systems capable of supporting simultaneous communication of multiple terminals with one or more base stations. One such wireless communication system may be a duplex system.

Duplex systems allow the concurrent transmission of signals and reception of signals between two wireless devices. A wireless device may transmit signals on a first frequency band and receive signals on a second frequency band.

In duplex systems, the noise generated by the transmitter that falls in the receiver's band is a significant problem. Such noise makes it more difficult for the receiver to detect the desired incoming signal. This effect can be reduced by either reducing the transmitter noise at its source through circuit design or by filtering the noise. However, both approaches may be expensive. A circuit solution may require high power consumption and/or larger devices. Filters are generally large and costly and a separate filter is required for each frequency band of operation. Benefits may be realized by providing improvements relating to the removal or reduction of the noise generated by a transmitter.

SUMMARY

A transmitter circuit is described. The transmitter circuit includes a first local oscillator that generates a first frequency equal to a duplex frequency. The transmitter circuit also includes a second local oscillator that generates a second frequency equal to a receive frequency. The transmitter circuit further includes a first mixer that combines the first frequency with a first input signal. The transmitter circuit also includes a first feedback loop. The first feedback loop includes a second mixer that combines the second frequency with a transmit signal. The first feedback loop also includes a first filter. The first feedback loop further includes a first adder that combines an output of the first mixer with an output of the first filter. The transmitter circuit further includes a third local oscillator that generates a third frequency equal to the receive frequency. The transmitter circuit also includes a third mixer that combines the third frequency with an output of the first adder.

The transmitter circuit may include a fourth local oscillator that generates a fourth frequency equal to the duplex frequency. The transmitter circuit may also include a second feedback loop. The second feedback loop may include the second mixer. The second feedback loop may also include a fourth mixer that combines the fourth frequency with an output of the second mixer. The second feedback loop may further include a second adder that combines an output of the fourth mixer with a second input signal. The transmitter circuit may also include a second filter.

The first filter may receive an output of the second mixer. The transmitter circuit may include a plant that receives an output of the third mixer and outputs the transmit signal. The plant may include an upconverter. The plant may include an amplifier. The first feedback loop may remove estimated transmit noise from the transmit signal. The second feedback loop may remove estimated transmit distortion from the transmit signal.

The output of the second filter may be the first input signal. The transmitter circuit may include a third adder that combines the second input signal and an output of the second filter. The output of the third adder may be the first input signal. The first input signal may include an inphase (I) modulated signal and a quadrature (Q) modulated signal. The second input signal may include an inphase (I) modulated signal and a quadrature (Q) modulated signal.

A method for noise cancellation in a transmit signal is also described. Transmit noise in the transmit signal that negatively affects a receive signal is estimated. Transmit distortion in the transmit signal that negatively affects the fidelity of the transmit signal is estimated. Estimated transmit noise is filtered from the transmit signal. Estimated transmit distortion is filtered from the transmit signal. A filtered transmit signal is provided to a duplexer.

Estimating transmit noise and filtering estimated transmit noise may include mixing a first input signal with a duplex frequency generated by a first local oscillator to obtain a first mixed signal. Estimated transmit noise and filtering estimated transmit noise may also include combining the first mixed signal with a negative feedback signal to obtain a first combined signal. Estimating transmit noise and filtering estimated transmit noise may further include mixing the first combined signal with a receive frequency generated by a second local oscillator to obtain a second mixed signal. Estimating transmit noise and filtering estimated transmit noise may also include applying a plant to the second mixed signal to obtain a transmit signal. Estimating transmit noise and filtering estimated transmit noise may further include applying a first feedback loop. Applying a first feedback loop may include mixing the transmit signal with a receive frequency generated by a third local oscillator to obtain a down-converted transmit signal. Applying a first feedback loop may also include filtering the down-converted transmit signal using a first filter to obtain the negative feedback signal.

Estimating transmit distortion and removing transmit distortion may include applying a second feedback loop. The second feedback loop may include mixing the down-converted transmit signal with a duplex frequency generated by a fourth local oscillator to obtain a third mixed signal. The second feedback loop may also include combining a second input signal with the third mixed signal to obtain a second combined signal. The second feedback loop may further include filtering the second combined signal using a second filter.

An output of the second filter may be the first input signal. The second feedback loop may include combining an output of the second filter with the second input signal to obtain a third combined signal. The third combined signal may be the first input signal. The first feedback loop may remove estimated transmit noise from the transmit signal. The second feedback loop may remove estimated transmit distortion from the transmit signal. The first input signal may include an inphase (I) modulated signal and a quadrature (Q) modulated signal. The second input signal may include an inphase (I) modulated signal and a quadrature (Q) modulated signal.

A wireless device configured for noise cancellation in a transmit signal is described. The wireless device includes means for estimating transmit noise in the transmit signal that negatively affects a receive signal. The wireless device also includes means for estimating transmit distortion in the transmit signal that negatively affects the fidelity of the transmit signal. The wireless device further includes means for filtering estimated transmit noise from the transmit signal. The wireless device also includes means for filtering estimated transmit distortion from the transmit signal. The wireless device further includes means for providing a filtered transmit signal to a duplexer.

A computer-readable medium encoded with computer-executable instructions is also described. Execution of the computer-executable instructions is for estimating transmit noise in the transmit signal that negatively affects a receive signal. Execution of the computer-executable instructions is also for estimating transmit distortion in the transmit signal that negatively affects the fidelity of the transmit signal. Execution of the computer-executable instructions is further for filtering estimated transmit noise from the transmit signal. Execution of the computer-executable instructions is also for filtering estimated transmit distortion from the transmit signal. Execution of the computer-executable instructions is further for providing a filtered transmit signal to a duplexer.

DETAILED DESCRIPTION

Figure 1:
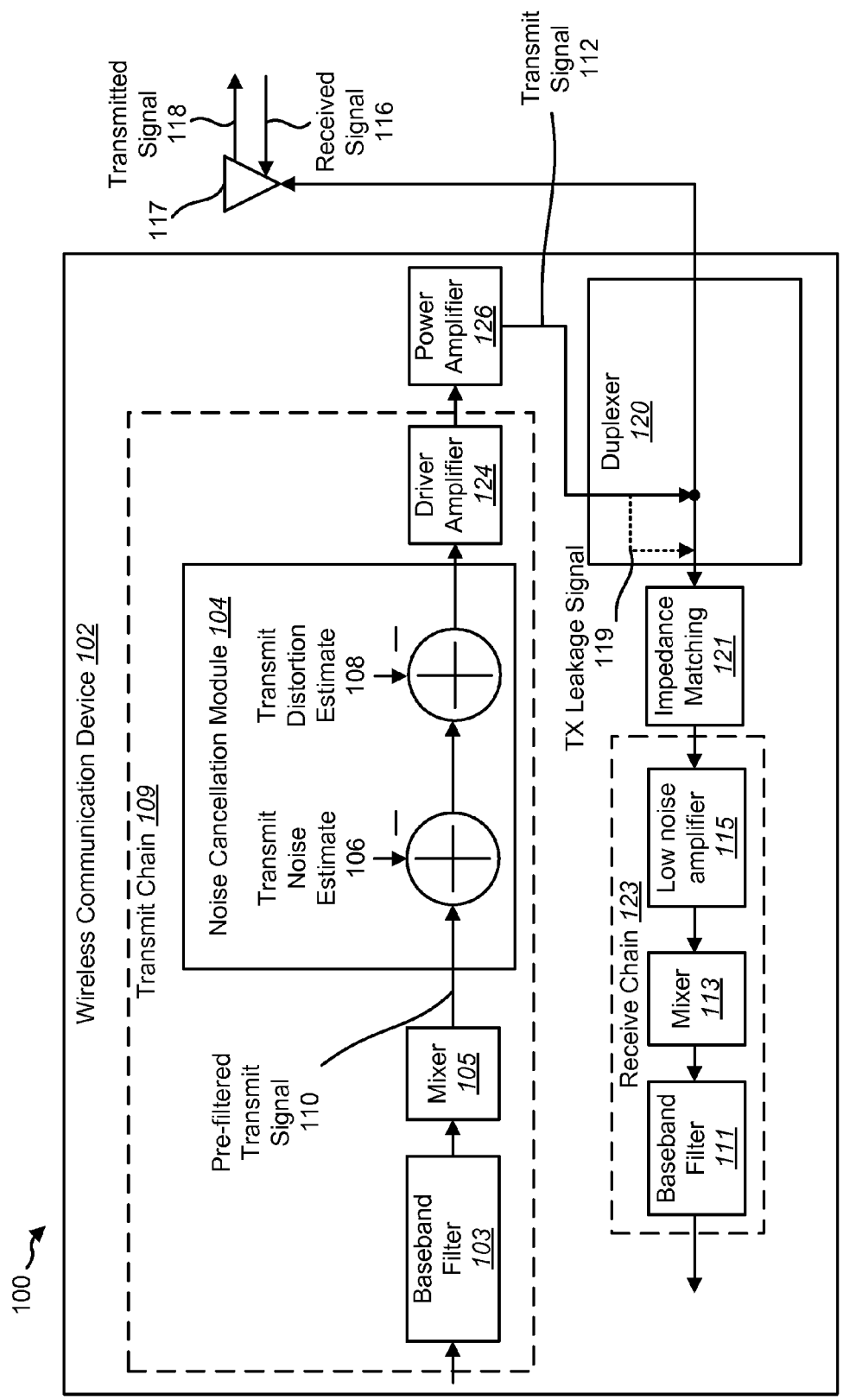
FIG. 1 shows a wireless communication system with a wireless communication device.

FIG. 1 shows a wireless communication system 100 with a wireless communication device 102. A wireless communication device 102 may be a base station, a mobile device, or the like. A base station is a station that communicates with one or more mobile devices. A base station may also be referred to as, and may include some or all of the functionality of, an access point, a broadcast transmitter, a Node B, an evolved Node B, etc. Each base station provides communication coverage for a particular geographic area. The term "cell" can refer to a base station and/or its coverage area depending on the context in which the term is used.

A mobile device may also be referred to as, and may include some or all of the functionality of, a terminal, an access terminal, a user equipment (UE), a subscriber unit, a station, etc. A mobile device may be a cellular phone, a personal digital assistant (PDA), a wireless device, a wireless modem, a handheld device, a laptop computer, etc. A mobile device may communicate with zero, one, or multiple base stations on the downlink (DL) and/or uplink (UL) at any given moment. The downlink (or forward link) refers to the communication link from a base station to the mobile device, and the uplink (or reverse link) refers to the communication link from the mobile device to the base station.

Wireless communication systems 100 may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and spatial division multiple access (SDMA) systems.

A wireless communication device 102 in a wireless full-duplex communication system 100 can simultaneously transmit and receive data for two-way communications. One such full-duplex system is a CDMA system. Information to be transmitted may be converted into analog form by a digital-to-analog converter in the digital baseband integrated circuit and supplied to a "transmit chain" 109. Baseband filter 103 filters out noise due to the digital-to-analog conversion process. Mixer block 105 then up-converts the signal into a high frequency signal.

On the transmit path, a transmitter within the wireless communication device 102 modulates data onto a radio frequency (RF) carrier signal to generate an RF modulated signal and amplifies the RF modulated signal to obtain a transmit signal 112 having the proper signal level. The transmit signal 112 is routed via a duplexer 120 and transmitted 118 from an antenna 117 to one or more wireless communication devices 102. On the receive path, a receiver within the wireless communication device receives a signal via the antenna 117 and duplexer 120 and amplifies, filters, and frequency downconverts the received signal 116 to obtain baseband signals, which are further processed to recover received data.

The noise cancelation described herein may be used for various wireless full-duplex communication systems 100. Noise cancelation may be used for various frequency bands such as a cellular band from 824 to 894 MHz, a Personal Communication System (PCS) band from 1850 to 1990 MHz, a Digital Cellular System (DCS) band from 1710 to 1880 MHz, an International Mobile Telecommunications-2000 (IMT-2000) band from 1920 to 2170 MHz, and so on. The uplink and downlink frequency bands are transmit (TX) and receive (RX) frequency bands, respectively, for a wireless communication device 102.

For a full-duplex wireless communication device 102, the RF circuitry in the receiver is often subjected to interference from the transmitter. For example, a portion of the transmit signal 112 may leak from the duplexer 120 to the receiver, and the leaked signal (which is commonly referred to as a "TX leakage" signal 119 or a "TX feed-through") may cause interference to a desired signal within the received signal 116. The TX leakage signal 119 may also be referred to as transmit noise.

In duplex systems, the noise generated by the transmitter that falls in the receiver's band may present a significant decrease in performance. For example, RX band noise may make it more difficult for the receiver to detect the desired incoming signal. This effect may be diminished by reducing the transmitter noise at the source through circuit design or by filtering the noise. However, both approaches may be expensive. A circuit solution may require high power consumption and/or larger devices. Filters are generally large and costly, and a separate filter is required for each frequency band of operation.

The transmitter noise may instead be canceled using a system level method. The method may be applied universally to all bands and may reduce the filtering requirements of the system. The method may be implemented using a noise cancellation module 104. The noise cancellation module 104 may receive a pre-filtered transmit signal 110. The pre-filtered transmit signal 110 may also be referred to as the baseband transmit signal. On the transmit path, a power amplifier (PA) within the wireless communication device 102 may receive and amplify a pre-filtered transmit signal 110 and provide a transmit signal 112. The transmit signal 112 may be routed through a duplexer 120 and transmitted 118 via an antenna 117.

A portion of the transmit signal 112 may couple or leak through the duplexer 120 to the receive path. The amount of TX leakage may be dependent on the isolation between the transmit and receive ports of the duplexer 120. For a surface wave acoustic (SAW) duplexer, the amount of leakage may be approximately 50 dB. A TX-RX isolation may describe the distance (in frequency) between the transmit frequency and the receive frequency. A lower TX-RX isolation may result in a higher level of TX leakage. On the receive path, a received signal 116 containing a desired signal may be received via the antenna 117. The received signal 116 may be routed through the duplexer 120.

The portion of the transmit signal 112 that leaks through the duplexer 120 to the receive path may be referred to as transmit noise 119. The noise cancellation module 104 may determine a transmit noise estimate 106 of a transmit signal 112 negatively affecting the received signal 116. The noise cancellation module 104 may then remove the transmit noise estimate 106 from the pre-filtered transmit signal 110 using an adder. The noise cancellation module 104 may also determine a transmit distortion estimate 108 of the transmit signal 112. The transmit distortion estimate 108 may affect the fidelity of the transmit signal 112. The noise cancellation module 104 may then remove the transmit distortion estimate 108 from the pre-filtered transmit signal 110 using an adder. A driver amplifier 124 and an external power amplifier 126 may amplify the high frequency signal to drive the antenna so that a high frequency RF signal 118 is transmitted from the antenna. The transmit signal 112 may be provided to the duplexer 120.

A high frequency RF signal 116 is received on the antenna. Information from RF signal 116 passes through duplexer 120, impedance matching network 121, and through the receive chain 123. The signal is amplified by low noise amplifier (LNA) 115 and is down-converted in frequency by mixer 113. The resulting down-converted signal is filtered by baseband filter 111 and is passed to the digital baseband integrated circuit.

Figure 2:
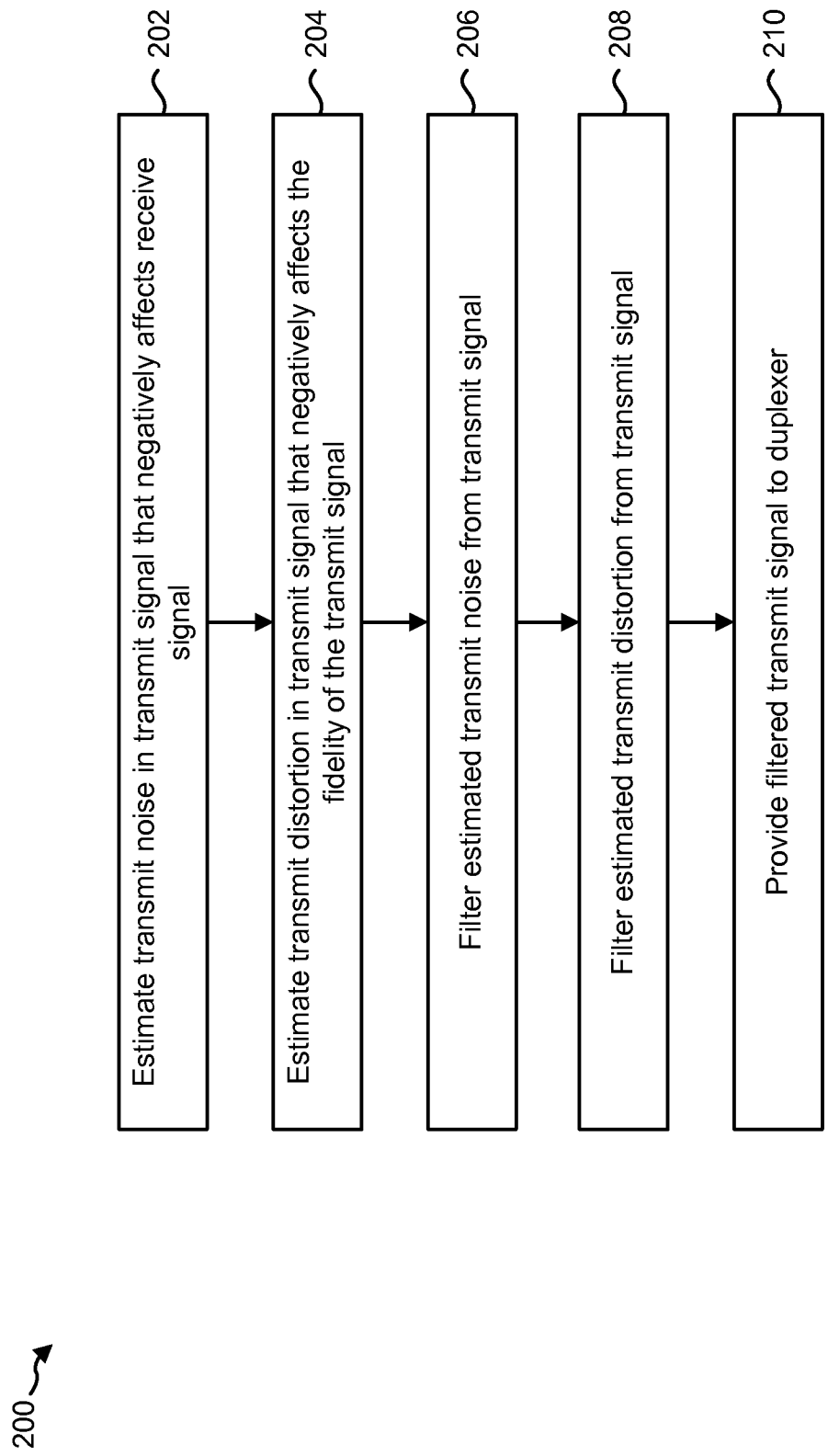
FIG. 2 is a flow diagram of a method for transmit noise cancellation.

FIG. 2 is a flow diagram of a method 200 for transmit noise cancellation. The method 200 may be performed by a wireless communication device 102. For example, the method 200 may be performed by a mobile station or by a base station. The wireless communication device 102 may estimate 202 transmit noise 106 in a transmit signal 112 that negatively affects a received signal 116. The transmit noise 106 in a transmit signal 112 that negatively affects a received signal 116 may include portions of the transmit signal 112 which may leak onto the receive band. The portions of the transmit signal 112 may leak onto the receive band in the duplexer 120. The wireless communication device 102 may also estimate 204 transmit distortion 108 in the transmit signal 112 that negatively affects the fidelity of the transmit signal 112.

The wireless communication device 102 may filter 206 the estimated transmit noise 106 from the transmit signal 112. The wireless communication device 102 may also filter 208 the estimated transmit distortion 108 from the transmit signal 112. The transmit signal 112 may then be provided 210 to a duplexer 120.

Figure 3:
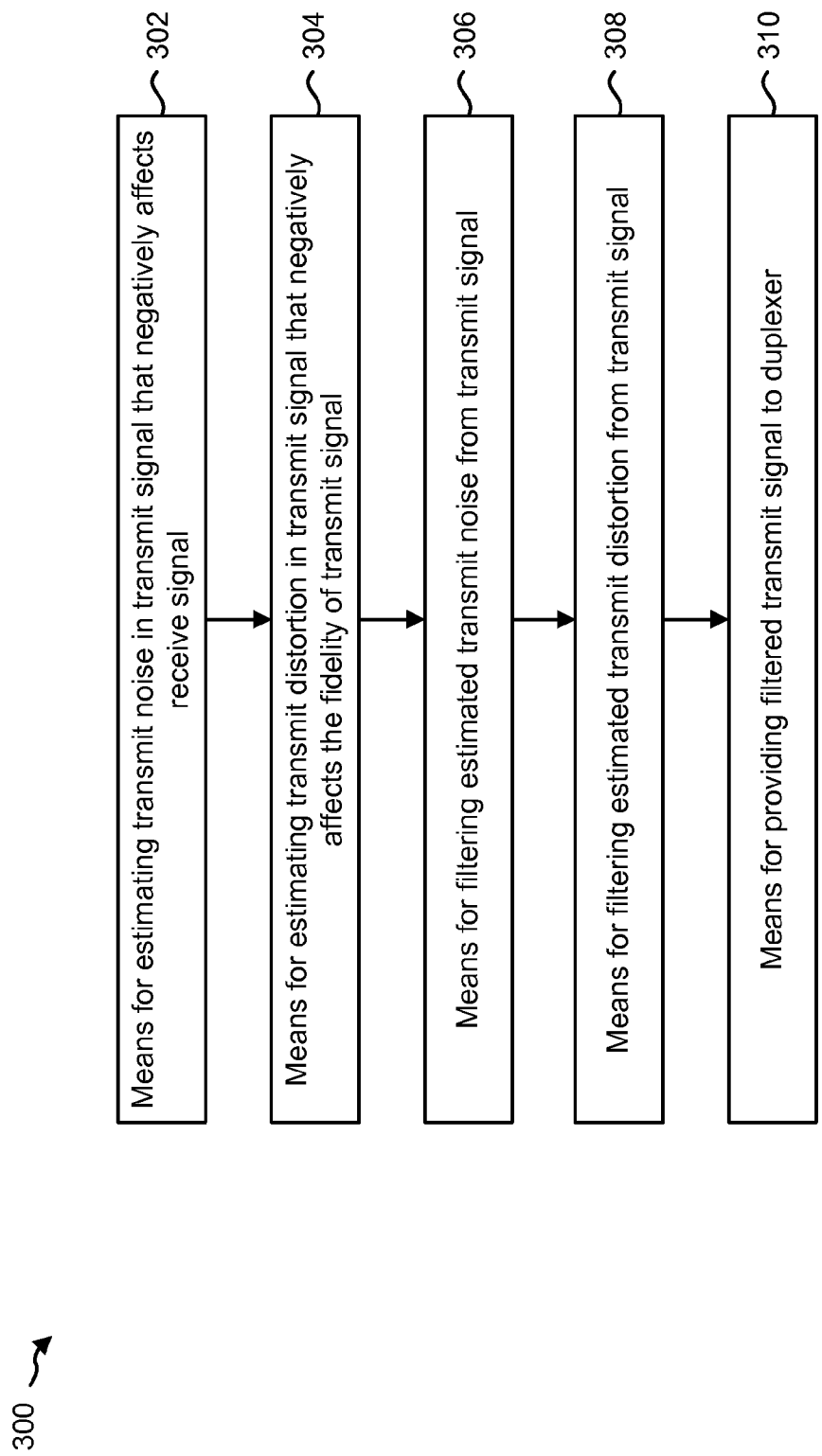
FIG. 3 illustrates means-plus-function blocks corresponding to the method of FIG. 2.

The method 200 of FIG. 2 described above may be performed by various hardware and/or software component(s) and/or module(s) corresponding to the means-plus-function blocks 300 illustrated in FIG. 3. In other words, blocks 202 through 210 illustrated in FIG. 2 correspond to means-plus-function blocks 302 through 310 illustrated in FIG. 3.

Figure 4:
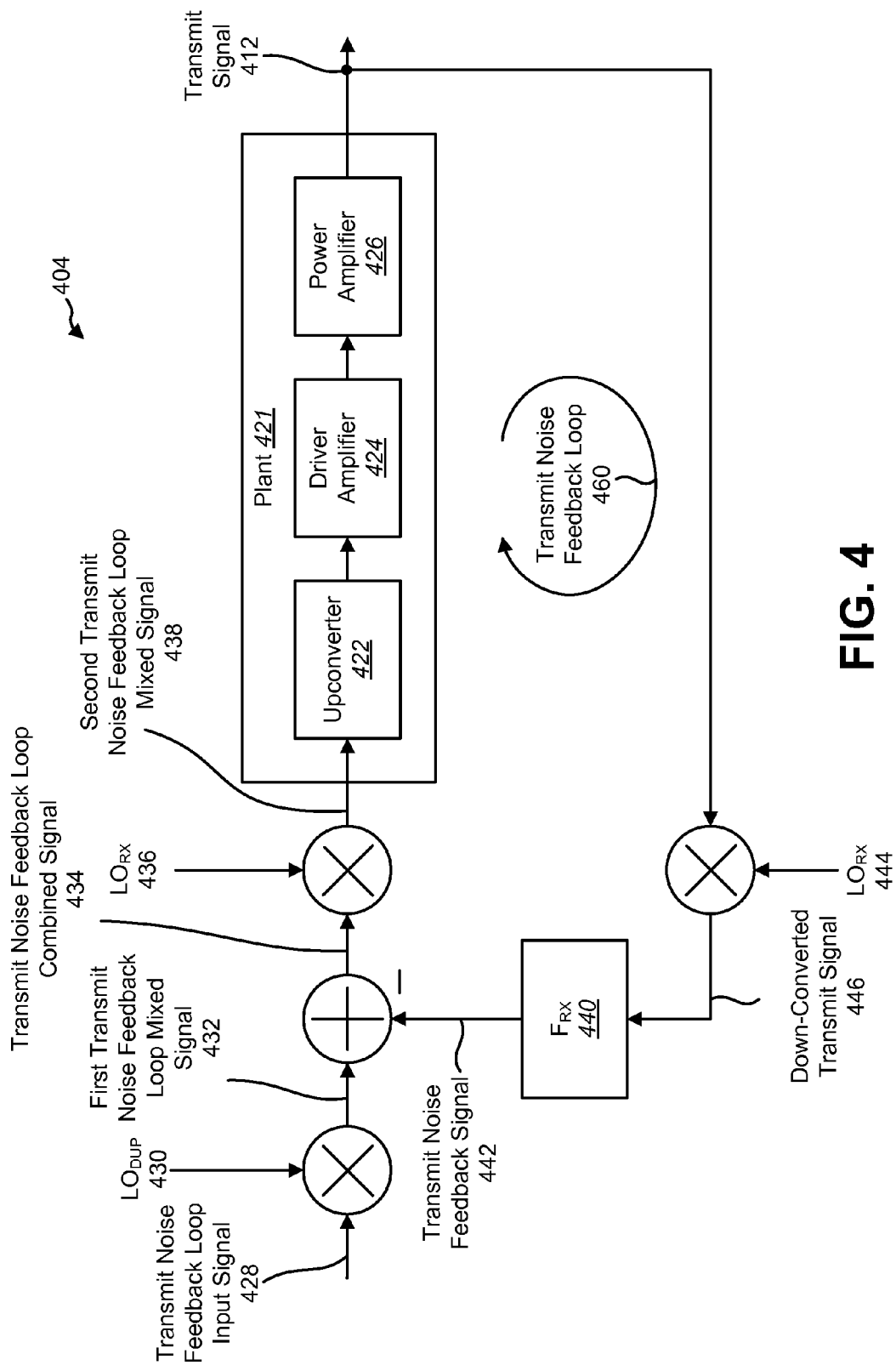
FIG. 4 is a block diagram illustrating the data flows within a noise cancellation module.

FIG. 4 is a block diagram illustrating the data flows within a noise cancellation module 404. For the purpose of showing feedback, a plant 421 is shown in FIG. 4 as part of the noise cancellation module 404 although the plant is actually not part of the noise cancellation module 404. The noise cancellation module 404 of FIG. 4 may be one configuration of the noise cancellation module 104 of FIG. 1. The noise cancellation module 404 may use a transmit noise feedback loop 460 to reject transmit noise. The noise cancellation module 404 may receive a transmit noise feedback loop input signal 428. In one configuration, the transmit noise feedback loop input signal 428 may be a pre-filtered transmit signal 110. The transmit noise feedback loop input signal 428 may be mixed with a duplex frequency to obtain a first transmit noise feedback loop mixed signal 432. In one configuration, the transmit noise feedback loop input signal 428 may be modulated with the duplex frequency. The duplex frequency may be generated by a first local oscillator $LO_{DUP}$ 430. The duplex frequency may refer to the frequency difference between the transmit frequency and the receive frequency. For example, if the wireless communication device 102 uses the frequency of 824 megahertz (MHz) for transmitting and 894 MHz for receiving, the duplex frequency would be 70 MHz.

The first transmit noise feedback loop mixed signal 432 may be combined with a transmit noise feedback signal 442 to obtain a transmit noise feedback loop combined signal 434. For example, an adder may subtract the transmit noise feedback signal 442 from the first transmit noise feedback loop mixed signal 432 to obtain the transmit noise feedback loop combined signal 434. The transmit noise feedback signal 442 may represent the estimated transmit noise 106 present in the transmit noise feedback loop input signal 428. In other words, the transmit noise feedback signal 442 may represent the amount of transmit noise expected to leak onto a received signal 116.

A second local oscillator $LO_{RX}$ 436 may generate a frequency equal to the receive frequency. The transmit noise feedback loop combined signal 434 may be mixed with the frequency generated by the second local oscillator 436 to obtain a second transmit noise feedback loop mixed signal 438. The second transmit noise feedback loop mixed signal 438 may thus be modulated at the receive frequency. Plant 421 operations may then be applied to the second transmit noise feedback loop mixed signal 438. In one configuration, the plant 421 operations may include applying an up-converter 422, a driver amplifier 424, and a power amplifier 426 to the second transmit noise feedback loop mixed signal 438. The output of the plant 421 is the transmit signal 412.

The transmit signal 412 may be down-converted to form a transmit noise feedback loop 460. The transmit noise feedback loop 460 may also be referred to as a negative feedback loop. A third local oscillator $LO_{RX}$ 444 may generate a frequency equal to the receive frequency. The transmit signal 412 may be down-converted by mixing the transmit signal 412 with the receive frequency generated by the third local oscillator 444 to form a down-converted transmit signal 446. The down-converted transmit signal 446 may then be filtered using a transmit noise feedback loop filter $F_{RX}$ 440 to obtain the transmit noise feedback signal 442. The transmit noise feedback loop filter $F_{RX}$ 440 may reject the transmit signal 412, stabilize the transmit noise feedback loop 460 and ensure that the system is robust. The resulting feedback may reject noise and disturbances in the forward path by a factor approximately equal to the loop gain.

Figure 5:
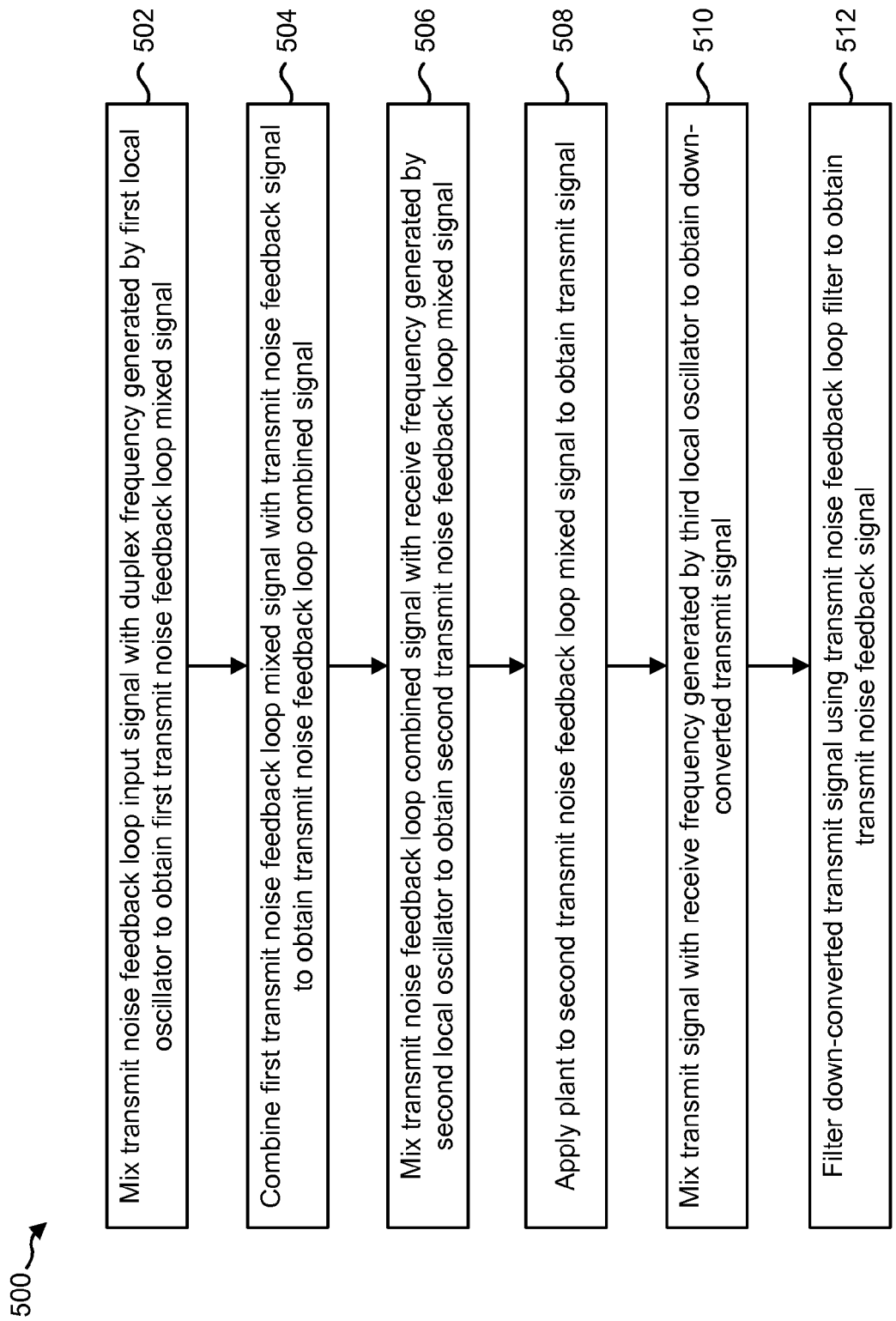
FIG. 5 is a flow diagram of a method for transmitter noise cancellation.

FIG. 5 is a flow diagram of a method 500 for transmitter noise cancellation. A transmit noise feedback loop input signal 428 may be mixed 502 with a duplex frequency generated by a first local oscillator 430 to obtain a first transmit noise feedback loop mixed signal 432. The first transmit noise feedback loop mixed signal 432 may be combined 504 with a transmit noise feedback signal 442 to obtain a transmit noise feedback loop combined signal 434. The transmit noise feedback loop combined signal 434 may be mixed 506 with a receive frequency generated by a second local oscillator 436 to obtain a second transmit noise feedback loop mixed signal 438. A plant 421 may then be applied 508 to the second transmit noise feedback loop mixed signal 438 to obtain a transmit signal 412. The transmit signal 412 may be mixed 510 with a receive frequency generated by a third local oscillator 444 to obtain a down-converted transmit signal 446. The down-converted transmit signal 446 may be filtered 512 using transmit noise feedback loop filter 440 to obtain the transmit noise feedback signal 442.

Figure 6:
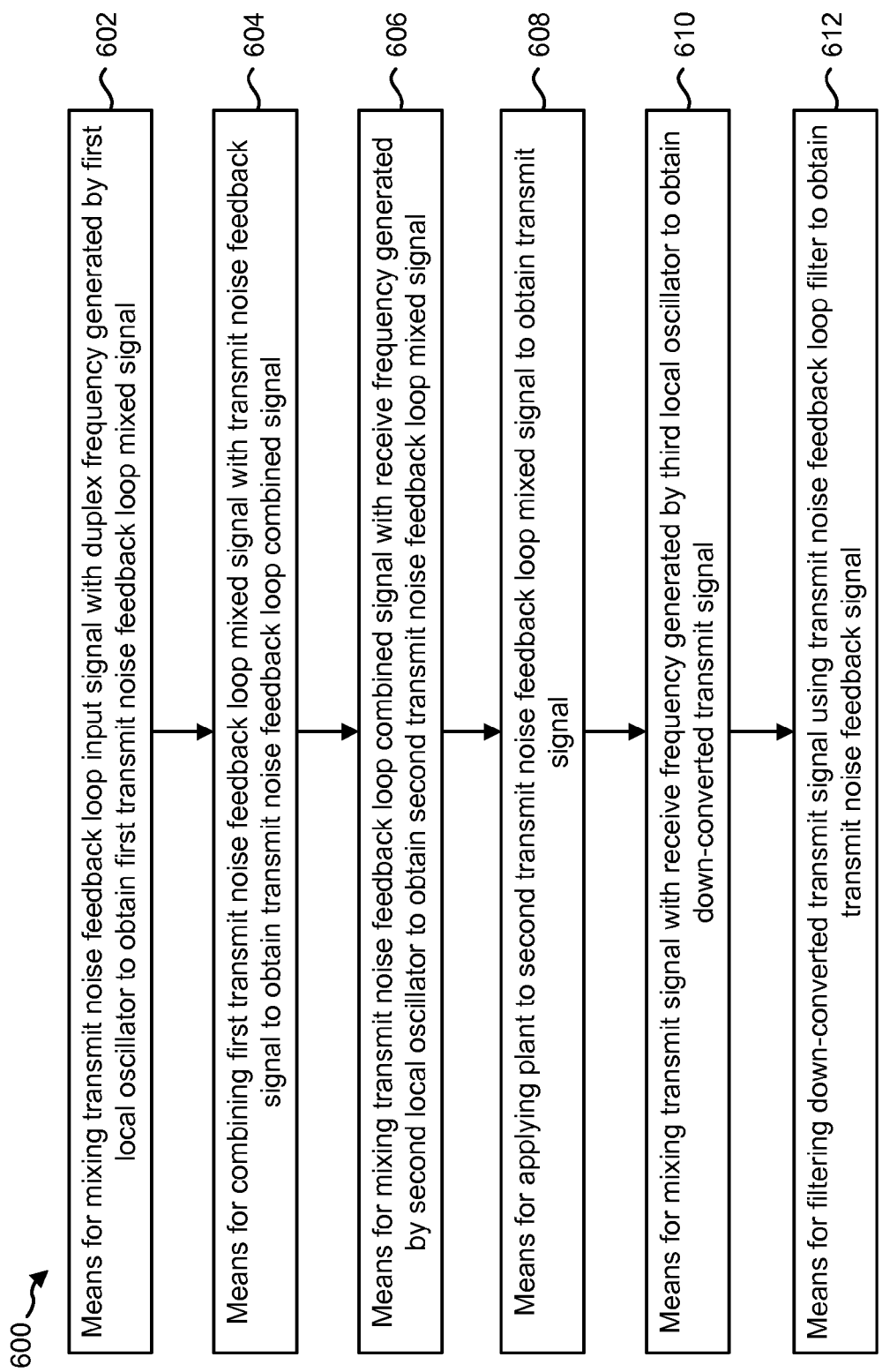
FIG. 6 illustrates means-plus-function blocks corresponding to the method of FIG. 5.

The method 500 of FIG. 5 described above may be performed by various hardware and/or software component(s) and/or module(s) corresponding to the means-plus-function blocks 600 illustrated in FIG. 6. In other words, blocks 502 through 512 illustrated in FIG. 5 correspond to means-plus-function blocks 602 through 612 illustrated in FIG. 6.

Figure 7:
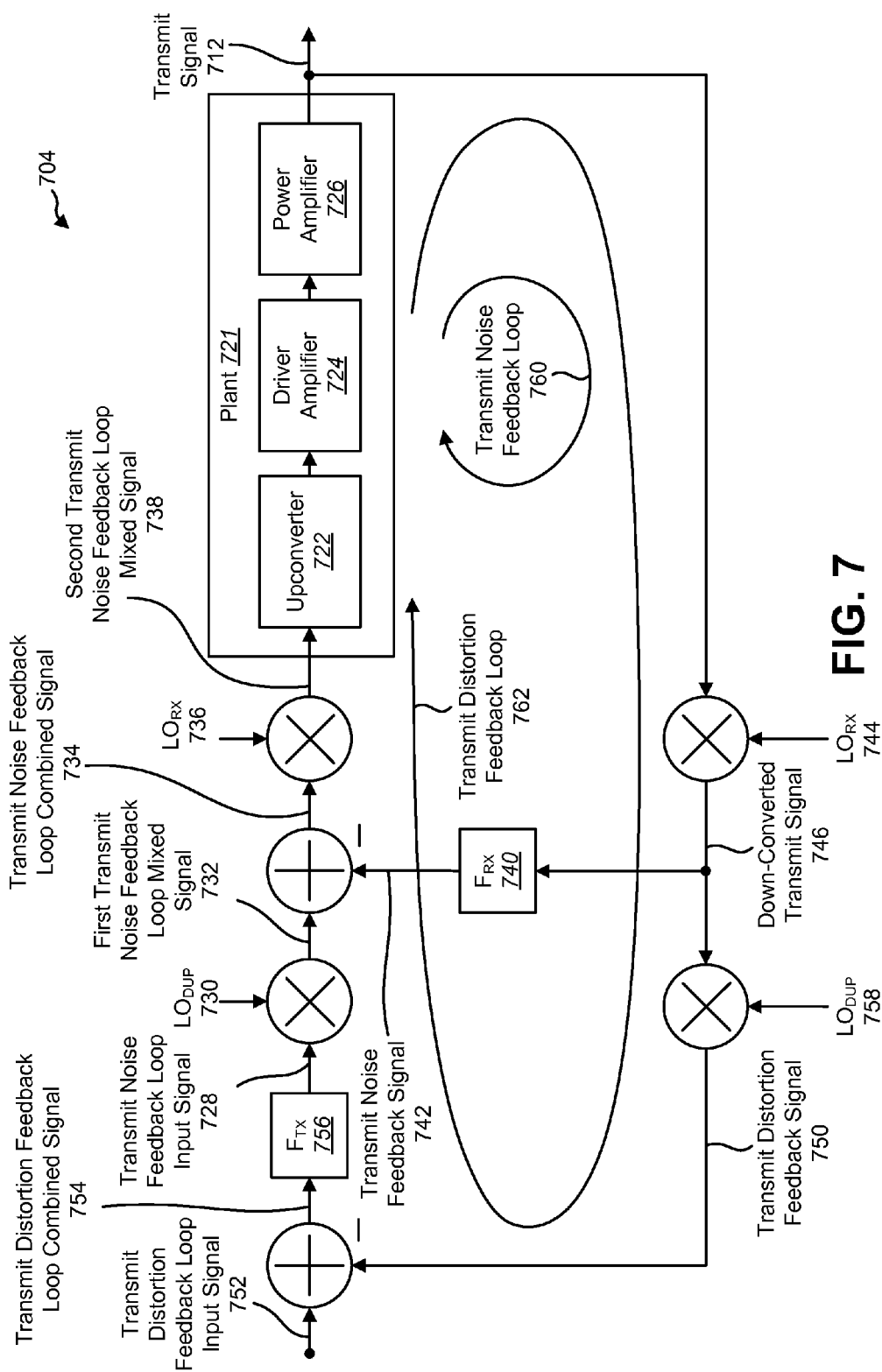
FIG. 7 is a block diagram illustrating data flows within a noise cancellation module with one feedback loop at the transmit frequency and one feedback loop at the receive frequency.

FIG. 7 is a block diagram illustrating data flows within a noise cancellation module 704 with one feedback loop at the transmit frequency 762 and one feedback loop 760 at the receive frequency. For the purpose of showing feedback, a plant 721 is shown in FIG. 7 as part of the noise cancellation module 704 although the plant is actually not part of the noise cancellation module 704. The noise cancellation module 704 of FIG. 7 may be one configuration of the noise cancellation module 104 of FIG. 1. The noise cancellation module 704 may use a transmit noise feedback loop 760 to reject transmit noise in a transmit signal 112 at the receive frequency. The noise cancellation module 704 may use a transmit distortion feedback loop 762 to reject transmit distortion in a transmit signal 112 at the transmit frequency. The transmit distortion estimate 108 of FIG. 1 does not explicitly appear in FIG. 7 because it is not identifiable as a distinct signal. However, the transmit distortion estimate 108 of FIG. 1 does explicitly appear in FIG. 10 as the unfiltered transmit distortion feedback signal.

The noise cancellation module 704 may receive a transmit distortion feedback loop input signal 752. In one configuration, the transmit distortion feedback loop input signal 752 may be a pre-filtered transmit signal 110. The transmit distortion feedback loop input signal 752 may be combined with a transmit distortion feedback signal 750 to obtain a transmit distortion feedback loop combined signal 754. The transmit distortion feedback signal 750 may represent the amount of transmit distortion expected to leak onto a received signal 116. The transmit distortion feedback signal 750 may be subtracted from the transmit distortion feedback loop input signal 752 using an adder.

The transmit distortion feedback loop combined signal 754 may then be filtered using a transmit distortion feedback loop filter $F_{TX}$ 756. The filtered transmit distortion feedback loop combined signal 754 may also be referred to as the transmit noise feedback loop input signal 728.

The transmit noise feedback loop input signal 728 may be mixed with a duplex frequency to obtain a first transmit noise feedback loop mixed signal 732. The duplex frequency may be generated by a first local oscillator $LO_{DUP}$ 730. The first transmit noise feedback loop mixed signal 732 may be combined with a transmit noise feedback signal 742 to obtain a transmit noise feedback loop combined signal 734. An adder may subtract the transmit noise feedback signal 742 from the first transmit noise feedback loop mixed signal 732 to obtain the transmit noise feedback loop combined signal 734.

A second local oscillator $LO_{RX}$ 736 may generate a frequency equal to the receive frequency. The transmit noise feedback loop combined signal 734 may be mixed with the frequency generated by the second local oscillator 736 to obtain a second transmit noise feedback loop mixed signal 738. The second transmit noise feedback loop mixed signal 738 may thus be modulated at the receive frequency. Plant 721 operations may then be applied to the second transmit noise feedback loop mixed signal 738. In one configuration, the plant 721 operations may include applying an up-converter 722, a driver amplifier 724, and a power amplifier 726 to the second transmit noise feedback loop mixed signal 738. The output of the plant 721 is the transmit signal 712.

The transmit signal 712 may be down-converted to form the transmit distortion feedback loop 762 and the transmit noise feedback loop 760. A third local oscillator $LO_{RX}$ 744 may generate a frequency equal to the receive frequency. The transmit signal 712 may be down-converted by mixing the transmit signal 712 with the receive frequency generated by the third local oscillator 744 to form a down-converted transmit signal 746. The down-converted transmit signal 746 may then be filtered using a transmit noise loop filter $F_{RX}$ 740 to obtain the transmit noise feedback signal 742. The transmit noise loop filter $F_{RX}$ 740 may reject the transmit signal 712, stabilize the transmit noise feedback loop 760 and ensure that the system is robust. The resulting feedback may reject noise and disturbances in the forward path by a factor approximately equal to the loop gain. The down-converted transmit signal 746 may also be mixed with a duplex frequency generated by a fourth local oscillator $LO_{DUP}$ 758 to obtain the transmit distortion feedback signal 750.

Figure 8:
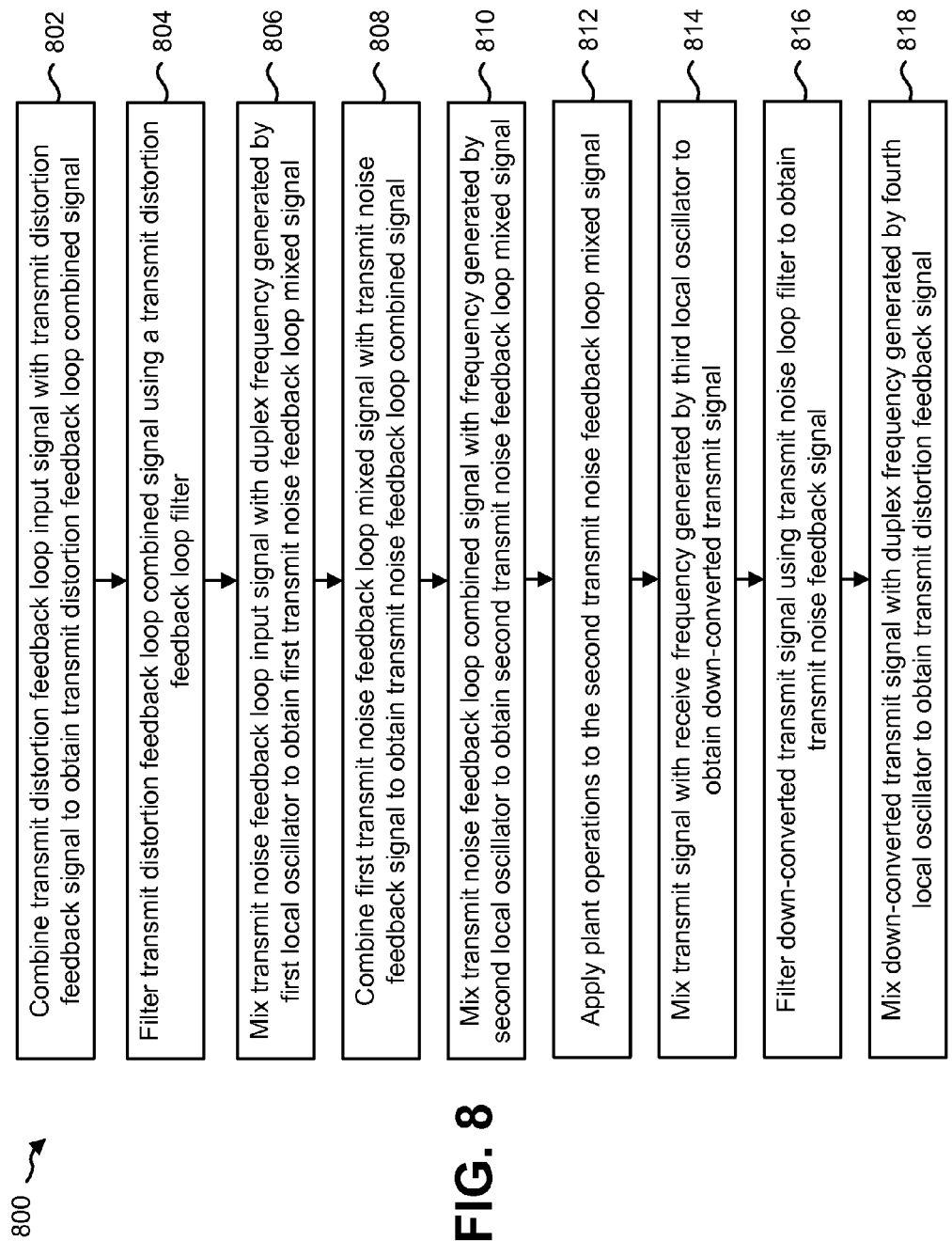
FIG. 8 is a flow diagram illustrating a method for transmit noise and distortion cancellation.

FIG. 8 is a flow diagram illustrating a method 800 for transmit noise and distortion cancellation. The method 800 may be performed by a wireless communication device 102. The wireless communication device 102 may combine 802 a transmit distortion feedback loop input signal 752 with a transmit distortion feedback signal 750 to obtain a transmit distortion feedback loop combined signal 754. The transmit distortion feedback loop combined signal 754 may be filtered 804 using a transmit distortion feedback loop filter $F_{TX}$ 756. The filtered transmit distortion feedback loop combined signal 754 may also be referred to as a transmit noise feedback loop input signal 728. The transmit noise feedback loop input signal 728 may be mixed 806 with a duplex frequency generated by a first local oscillator 730 to obtain a first transmit noise feedback loop mixed signal 732. The first transmit noise feedback loop mixed signal 732 may be combined 808 with a transmit noise feedback signal 742 to obtain a transmit noise feedback loop combined signal 734.

The transmit noise feedback loop combined signal 734 may be mixed 810 with a receive frequency generated by a second local oscillator 736 to obtain a second transmit noise feedback loop mixed signal 738. Plant 721 operations may then be applied 812 to the second transmit noise feedback loop mixed signal 738 to obtain a transmit signal 712. The transmit signal 712 may be mixed 814 with a receive frequency generated by a third local oscillator 744 to obtain a down-converted transmit signal 746. The down-converted transmitted signal 746 may then be filtered 816 using a transmit noise loop filter $F_{RX}$ 740 to obtain the transmit noise feedback signal 742. The down-converted transmit signal 746 may also be mixed 818 with a duplex frequency generated by a fourth local oscillator $LO_{DUP}$ 758 to obtain the transmit distortion feedback signal 750.

Figure 9:
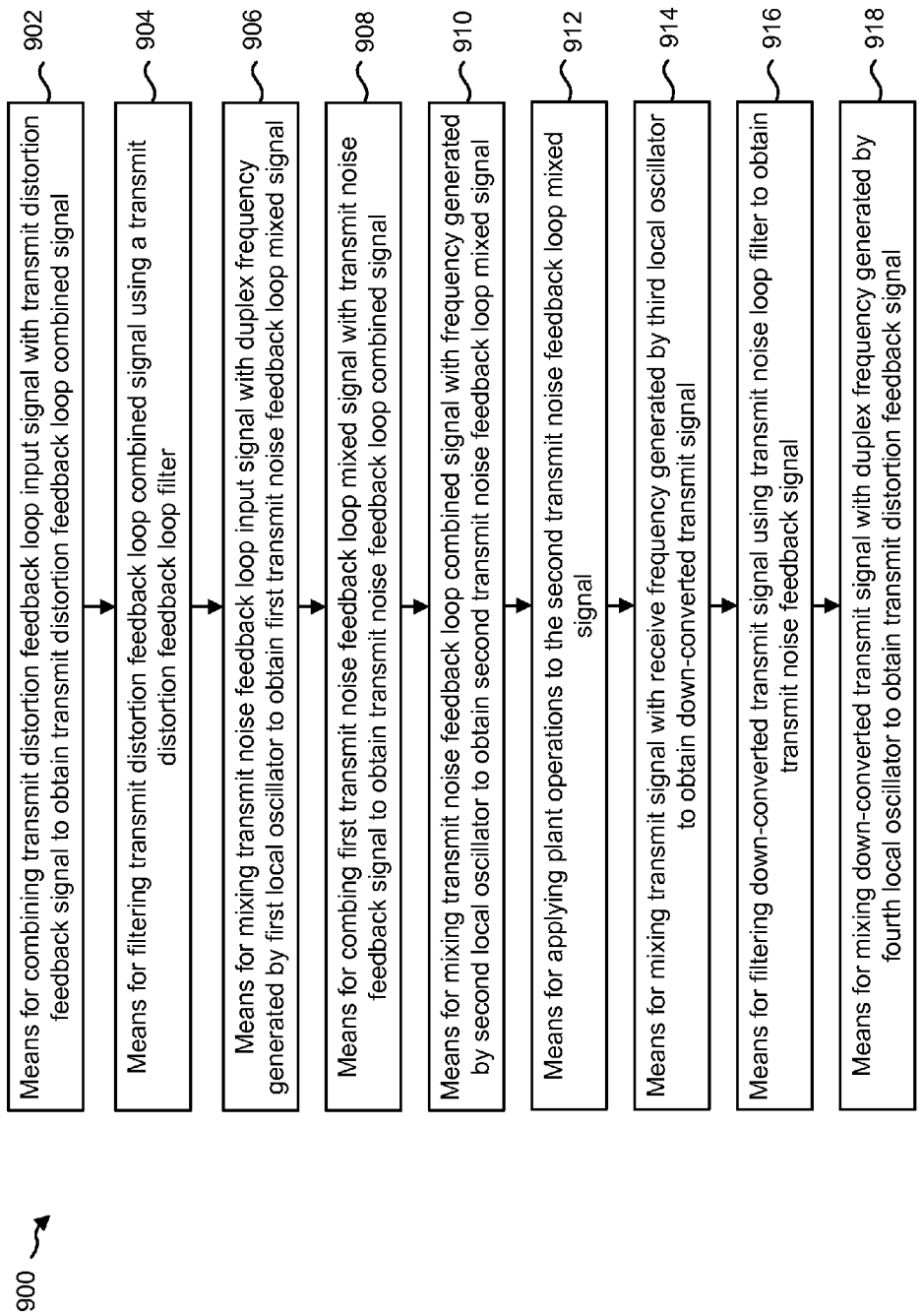
FIG. 9 illustrates means-plus-function blocks corresponding to the method of FIG. 8.

The method 800 of FIG. 8 described above may be performed by various hardware and/or software component(s) and/or module(s) corresponding to the means-plus-function blocks 900 illustrated in FIG. 9. In other words, blocks 802 through 818 illustrated in FIG. 8 correspond to means-plus-function blocks 902 through 918 illustrated in FIG. 9.

Figure 10:
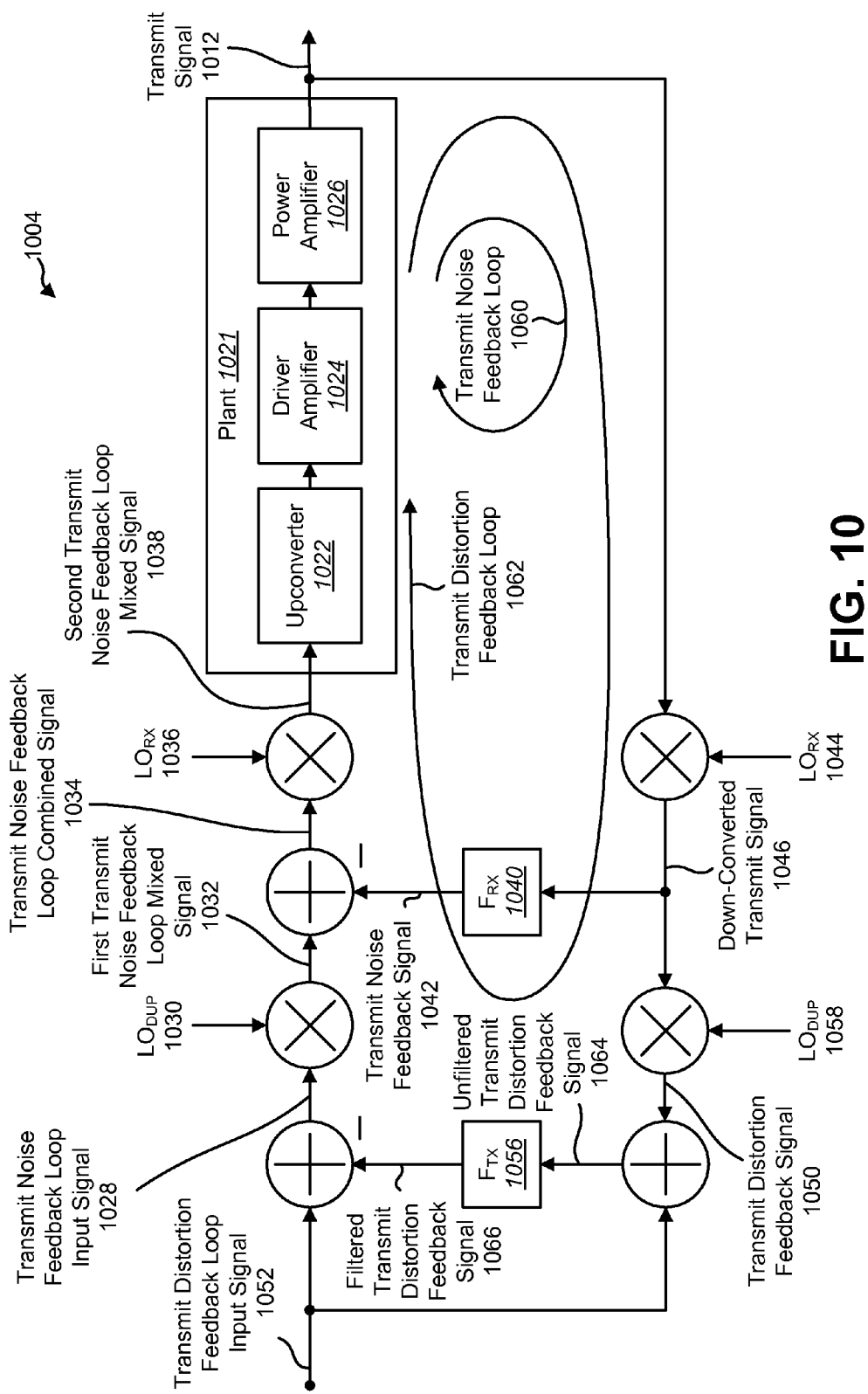
FIG. 10 is a block diagram illustrating data flows within another noise cancellation module with one feedback loop at the transmit frequency and one feedback loop at the receive frequency.

FIG. 10 is a block diagram illustrating data flows within a noise cancellation module 1004 with one feedback loop 1062 at the transmit frequency and one feedback loop 1060 at the receive frequency. For the purpose of showing feedback, a plant 1021 is shown in FIG. 10 as part of the noise cancellation module 1004 although the plant is actually not part of the noise cancellation module 1004. The noise cancellation module 1004 of FIG. 10 may be one configuration of the noise cancellation module 104 of FIG. 1. The noise cancellation module 1004 may use a transmit noise feedback loop 1060 to reject transmit noise at the receive frequency. A second down conversion stage may be added to the noise cancellation module 1004 so that a feedback system is also formed at the transmit frequencies. The noise cancellation module 1004 may use a transmit distortion feedback loop 1062 to reject transmit distortion at the transmit frequency.

The noise cancellation module 1004 may receive a transmit distortion feedback loop input signal 1052. The transmit distortion feedback loop input signal 1052 may be a pre-filtered transmit signal 110. The transmit distortion feedback loop input signal 1052 may be combined with a filtered transmit distortion feedback signal 1066 to obtain a transmit noise feedback loop input signal 1028. The filtered transmit distortion feedback signal 1066 may be subtracted from the transmit distortion feedback loop input signal 1052 using an adder. The filtered transmit distortion feedback signal 1066 may represent an estimate of the transmit distortion 108 in the transmit distortion feedback loop input signal 1052.

The transmit noise feedback loop input signal 1028 may be mixed with a duplex frequency to obtain a first transmit noise feedback loop mixed signal 1032. The duplex frequency may be generated by a first local oscillator $LO_{DUP}$ 1030. The first transmit noise feedback loop mixed signal 1032 may be combined with a transmit noise feedback signal 1042 to obtain a transmit noise feedback loop combined signal 1034. An adder may subtract the transmit noise feedback signal 1042 from the first transmit noise feedback loop mixed signal 1032 to obtain the transmit noise feedback loop combined signal 1034. The transmit noise feedback signal 1042 may represent an estimate of the transmit noise 106 in the first transmit noise feedback loop mixed signal 1032.

A second local oscillator 1036 may generate a frequency equal to the receive frequency. The transmit noise feedback loop combined signal 1034 may be mixed with the frequency generated by the second local oscillator 1036 to obtain a second transmit noise feedback loop mixed signal 1038. The second transmit noise feedback loop mixed signal 1038 may thus be modulated at the receive frequency. Plant 1021 operations may then be applied to the second transmit noise feedback loop mixed signal 1038. The plant 1021 operations may include applying an up-converter 1022, a driver amplifier 1024, and a power amplifier 1026 to the second transmit noise feedback loop mixed signal 1038. The output of the plant 1021 is the transmit signal 1012.

The transmit signal 1012 may be down-converted to form the transmit distortion feedback loop 1062 and the transmit noise feedback loop 1060. A third local oscillator 1044 may generate a frequency equal to the receive frequency. The transmit signal 1012 may be down-converted by mixing the transmit signal 1012 with the receive frequency generated by the third local oscillator 1044 to form a down-converted transmit signal 1046. The down-converted transmit signal 1046 may then be filtered using a transmit noise loop filter $F_{RX}$ 1040 to obtain the transmit noise feedback signal 1042. The transmit noise loop filter $F_{RX}$ 1040 may reject the transmit signal 1012, stabilize the transmit noise feedback loop 1060 and ensure that the system is robust. The resulting feedback may reject noise and disturbances in the forward path by a factor approximately equal to the loop gain.

The down-converted transmit signal 1046 may also be mixed with a duplex frequency generated by a fourth local oscillator $LO_{DUP}$ 1058 to obtain a transmit distortion feedback signal 1050. The transmit distortion feedback signal 1050 may be combined with the transmit distortion feedback loop input signal 1052 to obtain an unfiltered transmit distortion feedback signal 1064. The transmit distortion feedback signal 1050 and the transmit distortion feedback loop input signal 1052 may be combined using an adder. The unfiltered transmit distortion feedback signal 1064 may then be filtered using a transmit distortion feedback loop filter $F_{TX}$ 1056 to obtain the filtered transmit distortion feedback signal 1066. The transmit distortion feedback loop filter $F_{TX}$ 1056 may stabilize the system and make the system robust. A reconfiguration of the transmitter feedback as shown in FIG. 10 may allow the inphase/quadrature (I/Q) phase-shift of the plant 1021 to be automatically corrected. The transmit noise feedback loop 1060 and the transmit distortion feedback loop 1062 may be independent from each other. For example, the transmit distortion feedback loop 1062 and the transmit noise feedback loop 1060 may each apply to different specific frequency bands.

Figure 11:
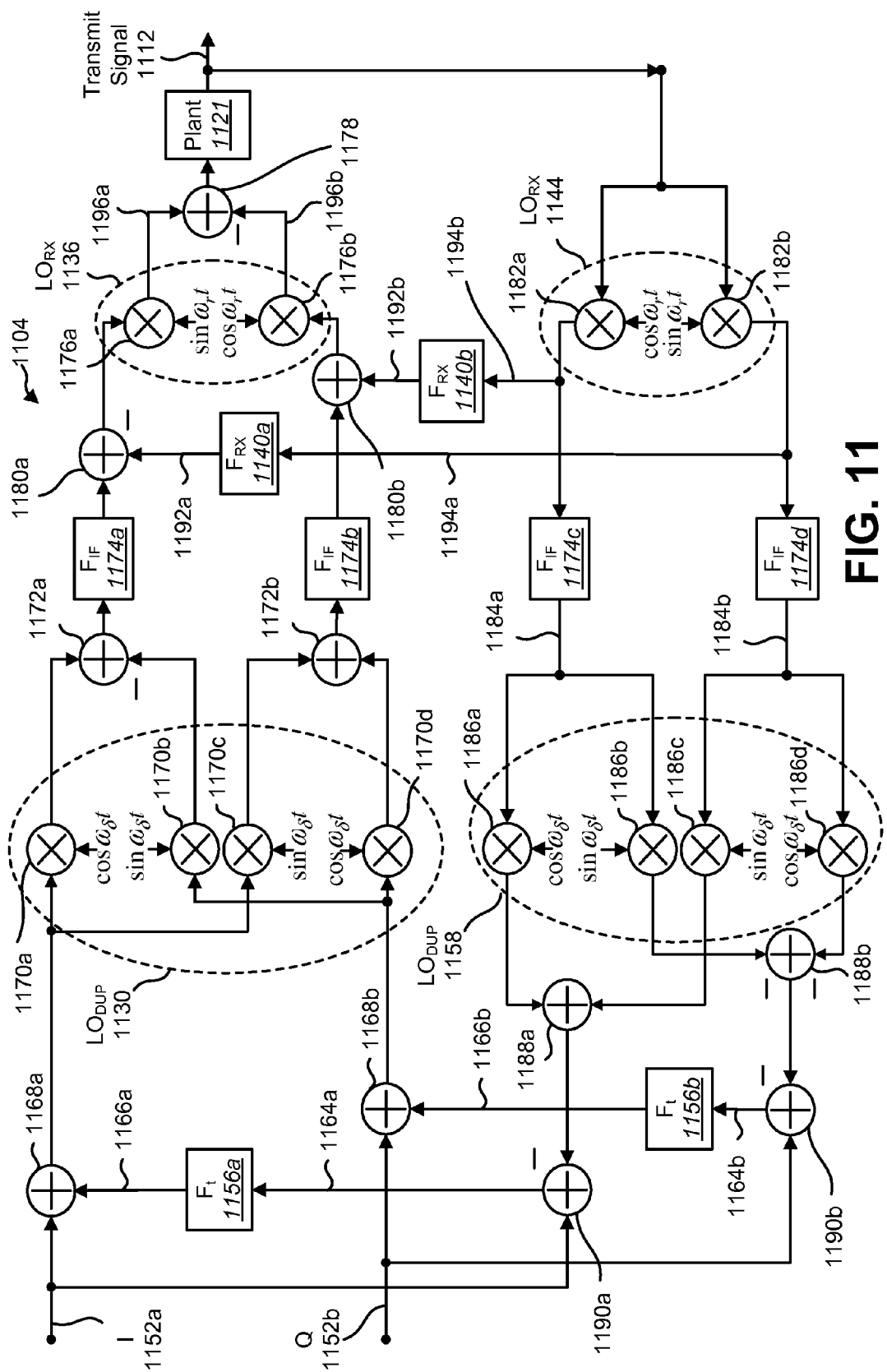
FIG. 11 illustrates an architecture implementation of a noise cancellation module.

FIG. 11 illustrates an architecture implementation of a noise cancellation module 1104. The noise cancellation module 1104 of FIG. 11 may be one configuration of the noise configuration module 1004 of FIG. 10. The noise cancellation module 1104 may use an up/down-conversion architecture. The noise cancellation module 1104 may use the Wide-Band IF (intermediate frequency) with Double Conversion (WB-IFDC) approach for implementation. One advantage of this approach is that expensive image-rejection filters may not be required. The IF filters 1174 shown in FIG. 11 may be less expensive than image rejection filters.

The basic principle of this noise cancellation module 1104 scheme is to generate a quadrature signal at the IF frequency, which may subsequently allow the image to be canceled with the final up (or down) conversion. The WBIFDC system of FIG. 11 is arranged to select the lower sideband. This may be required when the receive frequency is greater than the transmit frequency, which is common.

The noise cancellation module 1104 may receive a transmit distortion feedback loop input signal 1052. The carrier signal may be a periodic signal (e.g., a sinusoidal signal) of a particular frequency. The modulating wave may be derived from the coded data and may be provided as an inphase (I) modulating signal and a quadrature (Q) modulating signal. The amplitude and/or phase of the carrier signal may be varied by the modulating signals. Information may then reside in the changes in the amplitude and/or the phase of the carrier signal. The transmit distortion feedback loop input signal 1052 may thus include an I modulated signal 1152a and a Q modulated signal 1152b.

The I modulated signal 1152a may be combined 1168a with a first path filtered transmit distortion feedback signal 1166a and then mixed 1170a,c with a duplex frequency generated by a first local oscillator 1130. Likewise, the Q modulated signal 1152b may be combined 1168b with a second path filtered transmit distortion feedback signal 1166b and then mixed 1170b,d with a duplex frequency generated by the first local oscillator 1130. The duplex frequency may be generated using cos $\omega_\delta t$ and sin $\omega_\delta t$.

In a first forward path, the I modulated signal 1152a may be mixed 1170a with cos $\omega_\delta t$ and the Q modulated signal 1152b may be mixed 1170b with sin $\omega_\delta t$ from the first local oscillator 1130; the mixed signals may be combined 1172a and filtered using a first IF filter $F_{IF}$ 1174a. The mixed signals may be combined 1172a by subtracting the Q modulated signal 1152b mixed 1170a with sin $\omega_\delta t$ from the I modulated signal 1152a mixed 1170b with cos $\omega_\delta t$. The filtered mixed signals may then be combined 1180a with a first transmit noise feedback signal 1192a and mixed 1176a with a receive frequency sin $\omega_r t$ generated by a second local oscillator $LO_{RX}$ 1136 to obtain a first path transmit signal 1196a. In one configuration, the first transmit noise feedback signal 1192a may be subtracted from the combined mixed signals.

In a second forward path, the I modulated signal 1152a may be mixed 1170c with sin $\omega_\delta t$ and the Q modulated signal 1152b may be mixed 1170d with cos $\omega_\delta t$; the mixed signals may then be combined 1172b and filtered using a second IF filter $F_{IF}$ 1174b. The filtered mixed signals may then be combined 1180b with a second transmit noise feedback signal 1192b and mixed 1176b with a receive frequency cos $\omega_r t$ generated by the second local oscillator 1136 to obtain a second path transmit signal 1196b. The first path transmit signal 1196a and the second path transmit signal 1196b may then be combined 1178 and entered into a plant 1121. In one configuration, the second path transmit signal 1196b may be subtracted from the first path transmit signal 1196a to form the transmit signal 1112. As discussed above in relation to FIG. 4, the plant may include an upconverter, a driver amplifier, and a power amplifier. The output of the plant is the transmit signal 1112.

In a first feedback path, the transmit signal 1112 may be mixed 1182a with the receive frequency cos $\omega_r t$ generated by a third local oscillator $LO_{RX}$ 1144 to generate a first feedback path mixed signal 1194b. The first path mixed signal 1194b may then be filtered using a first transmit noise feedback loop filter $F_{RX}$ 1140b to obtain the second transmit noise feedback signal 1192b. The filter $F_{RX}$ 1140b of FIG. 11 may be one configuration of the transmit noise loop filter $F_{RX}$ 1040 of FIG. 10. The first path mixed signal 1194b may also be filtered using a third IF filter $F_{IF}$ 1174c to obtain a first feedback path filtered signal 1184a.

In second feedback path, the transmit signal 1112 may be mixed 1182b with the receive frequency sin $\omega_r t$ generated by the third local oscillator $LO_{RX}$ 1144 to obtain a second path mixed signal 1194a. The second path mixed signal 1194a may then be filtered using a second transmit noise feedback loop filter $F_{RX}$ 1140a to obtain the first transmit noise feedback signal 1192a. The second path mixed signal 1194a may also be filtered using a fourth IF filter $F_{IF}$ 1174d to obtain a second feedback path filtered signal 1184b.

The first feedback path filtered signal 1184a may be mixed 1186a with the duplex frequency cos $\omega_\delta t$ generated by a fourth local oscillator $LO_{DUP}$ 1158. The second feedback path filtered signal 1184b may be mixed 1186c with the duplex frequency sin $\omega_\delta t$ generated by the fourth local oscillator 1158. The mixed signals may then be combined 1188a and the combined signal may be combined 1190a with the I modulated signal 1152a to obtain a first pre-filter signal 1164a. The combined signal may be combined 1190a with the I modulated signal 1152a by subtracting the combined signal from the I modulated input signal 1152a. The first pre-filter signal 1164a may then be filtered using a first transmit distortion feedback loop filter $F_t$ 1156a to obtain the first path filtered transmit distortion feedback signal 1166a. The filter $F_t$ 1156a of FIG. 11 may be one configuration of the transmit distortion feedback loop filter $F_{TX}$ 1056 of FIG. 10.

The second feedback path filtered signal 1184b may be mixed 1186d with the duplex frequency cos $\omega_\delta t$ generated by the fourth local oscillator $LO_{DUP}$ 1158. The first feedback path filtered signal 1184a may be mixed 1186b with the duplex frequency sin $\omega_\delta t$ generated by the fourth local oscillator 1158. The mixed signals may then be combined 1188b and the combined signal may be combined 1190b with the Q modulated signal 1152b to obtain a second pre-filter signal 1164b. The combined signal may be combined 1190b with the Q modulated signal 1152b by subtracting the combined signal from the Q modulated signal 1152b. The second pre-filter signal 1164b may then be filtered using a second transmit distortion feedback loop filter $F_t$ 1156b to obtain the second path filtered transmit distortion feedback signal 1166b.

Figure 12:
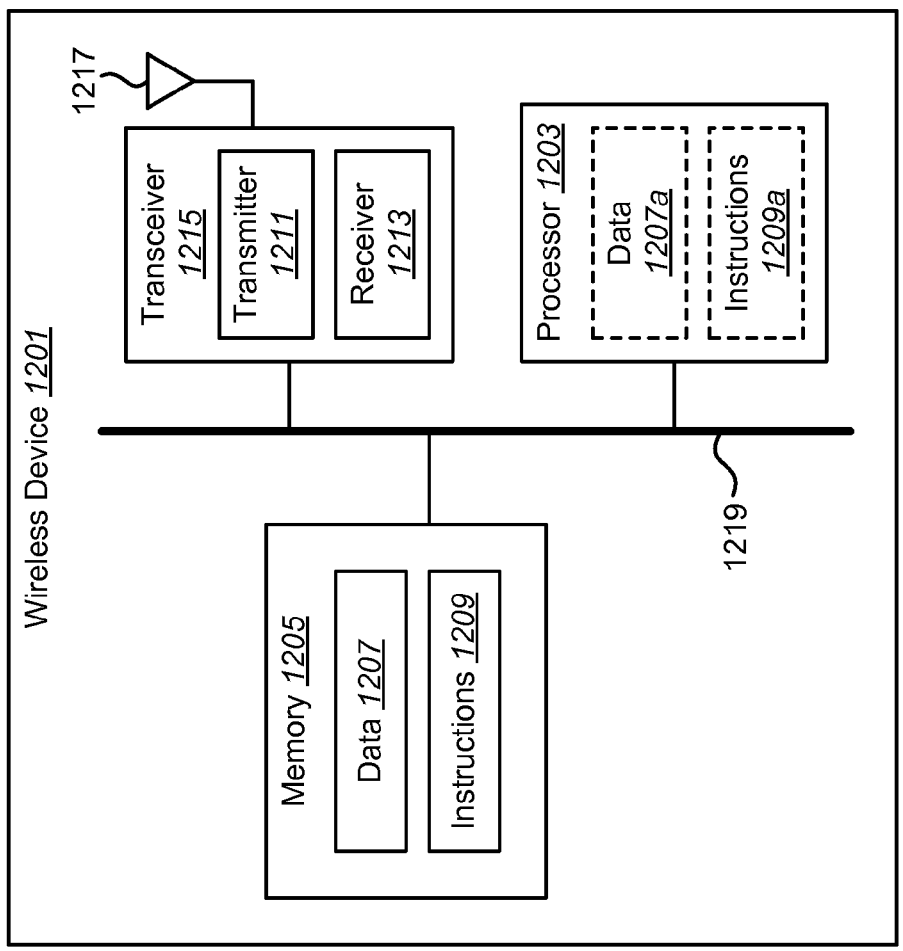
FIG. 12 illustrates certain components that may be included within a wireless device that is configured in accordance with the present disclosure.

FIG. 12 illustrates certain components that may be included within a wireless device 1201. The wireless device 1201 may be a wireless communication device 102. For example, the wireless device 1201 may be a mobile station or a base station.

The wireless device 1201 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless device 1201 of FIG. 12, in an alternative configuration, a combination of processors (e.g., an ARM and DSP) could be used.

The wireless device 1201 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1209, various portions of the instructions 1209a may be loaded onto the processor 1203, and various pieces of data 1207a may be loaded onto the processor 1203.

The wireless device 1201 may also include a transmitter 1211 and a receiver 1213 to allow transmission and reception of signals to and from the wireless device 1201. The transmitter 1211 and receiver 1213 may be collectively referred to as a transceiver 1215. An antenna 1217 may be electrically coupled to the transceiver 1215. The wireless device 1201 may also include (not shown) multiple transmitters, multiple receivers, multiple transceivers and/or multiple antenna.

The various components of the wireless device 1201 may be coupled together by one or more buses, which may include a power bus, a control signal bus, a status signal bus, a data bus, etc. For the sake of clarity, the various buses are illustrated in FIG. 12 as a bus system 1219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 5 and 8, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A transmitter circuit comprising:
   a first local oscillator, wherein the first local oscillator generates a first frequency equal to a duplex frequency;
   a second local oscillator, wherein the second local oscillator generates a second frequency equal to a receive frequency;
   a first mixer, wherein the first mixer combines the first frequency with a first input signal;
   a first feedback loop, wherein the first feedback loop comprises:
      a second mixer, wherein the second mixer combines the second frequency with a transmit signal;

a first filter; and a first adder, wherein the first adder combines an output of the first mixer with an output of the first filter;

a third local oscillator, wherein the third local oscillator generates a third frequency equal to the receive frequency; and a third mixer, wherein the third mixer combines the third frequency with an output of the first adder.

2. The transmitter circuit of claim 1, further comprising:

a fourth local oscillator, wherein the fourth local oscillator generates a fourth frequency equal to the duplex frequency;

a second feedback loop, wherein the second feedback loop comprises:

the second mixer;

a fourth mixer, wherein the fourth mixer combines the fourth frequency with an output of the second mixer; and a second adder, wherein the second adder combines an output of the fourth mixer with a second input signal; and a second filter.

3. The transmitter circuit of claim 1, wherein the first filter receives an output of the second mixer.

4. The transmitter circuit of claim 1, further comprising a plant, wherein the plant receives an output of the third mixer and outputs the transmit signal.

5. The transmitter circuit of claim 4, wherein the plant comprises an upconverter.

6. The transmitter circuit of claim 4, wherein the plant comprises an amplifier.

7. The transmitter circuit of claim 1, wherein the first feedback loop removes estimated transmit noise from the transmit signal.

8. The transmitter circuit of claim 2, wherein the second feedback loop removes estimated transmit distortion from the transmit signal.

9. The transmitter circuit of claim 2, wherein the output of the second filter is the first input signal.

10. The transmitter circuit of claim 2, further comprising a third adder, wherein the third adder combines the second input signal and an output of the second filter.

11. The transmitter circuit of claim 10, wherein the output of the third adder is the first input signal.

12. The transmitter circuit of claim 1, wherein the first input signal comprises an inphase (I) modulated signal and a quadrature (Q) modulated signal.

13. The transmitter circuit of claim 2, wherein the second input signal comprises an inphase (I) modulated signal and a quadrature (Q) modulated signal.

* * * * *